(12) United States Patent
Masuoka

(10) Patent No.: US 7,454,752 B2
(45) Date of Patent: Nov. 18, 2008

(54) METHOD FOR GENERATING POLICY RULES AND METHOD FOR CONTROLLING JOBS USING THE POLICY RULES

(75) Inventor: Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 830 days.

(21) Appl. No.: 10/809,435

(22) Filed: Mar. 26, 2004

(65) Prior Publication Data

US 2004/0194107 A1    Sep. 30, 2004

(30) Foreign Application Priority Data

Mar. 27, 2003    (JP) ............................. 2003-086919

(51) Int. Cl.
*G06F 9/46* (2006.01)
*G06F 11/00* (2006.01)

(52) U.S. Cl. ..................... 718/102; 718/104; 714/2; 714/48; 714/701

(58) Field of Classification Search ................ 718/101, 718/102, 104; 717/127; 709/201, 202; 716/6, 716/7; 703/17, 19; 714/1, 2, 48, 701
See application file for complete search history.

(56) References Cited

U.S. PATENT DOCUMENTS

| | | | | |
|---|---|---|---|---|
| 5,655,081 | A | * | 8/1997 | Bonnell et al. ............... 709/202 |
| 5,774,718 | A | * | 6/1998 | Aoshima et al. ............. 718/100 |
| 5,963,911 | A | * | 10/1999 | Walker et al. .................. 705/7 |
| 6,041,425 | A | * | 3/2000 | Kokunishi et al. ............ 714/37 |
| 6,205,468 | B1 | * | 3/2001 | Diepstraten et al. ......... 718/108 |
| 6,504,621 | B1 | | 1/2003 | Salgado |
| 6,665,716 | B1 | * | 12/2003 | Hirata et al. ................. 709/224 |
| 6,779,016 | B1 | | 8/2004 | Aziz et al. |
| 6,889,243 | B1 | * | 5/2005 | Hondou et al. ............... 718/100 |
| 7,069,473 | B2 | * | 6/2006 | Yasuda ......................... 714/37 |
| 7,089,557 | B2 | * | 8/2006 | Lee ............................. 718/102 |

(Continued)

FOREIGN PATENT DOCUMENTS

JP    05-088917    4/1993

OTHER PUBLICATIONS

Aiming to improve qaulity in outsourcing services through introduction, IBM Customers Reference 2, Provision No. 33, p. 34, Table 1, Spring 2002.

*Primary Examiner*—Meng-Ai An
*Assistant Examiner*—Caroline Arcos
(74) *Attorney, Agent, or Firm*—Antonelli, Terry, Stout & Kraus, LLP.

(57) ABSTRACT

Generating policy rules by: storing a job execution schedule containing complete schedule times of jobs; and storing a job execution condition describing an execution limit condition and a method of evaluating an amount of loss incurred when the execution limit condition is not met, for the plurality of jobs; wherein a rule generation tool, under control by a processor of a policy rule generator, executes: evaluating an amount of loss by referring to the job execution schedule and the job execution condition when a special action is taken in the event that a special event occurs in a special one of the jobs at a special time; and evaluating an amount of loss in respect of all of plural actions prepared for the special job and the special event at the special time and determining an action which minimizes the evaluated loss amount thereby to generate a policy rule.

13 Claims, 9 Drawing Sheets

U.S. PATENT DOCUMENTS

2001/0029591 A1* 10/2001 Takeda .......................... 714/5
2002/0022945 A1* 2/2002 Takayasu et al. ............ 702/186
2002/0129297 A1* 9/2002 Takeda ........................ 714/15
2003/0028642 A1 2/2003 Agarwal et al.
2004/0093254 A1* 5/2004 Hirata et al. ................... 705/8

* cited by examiner

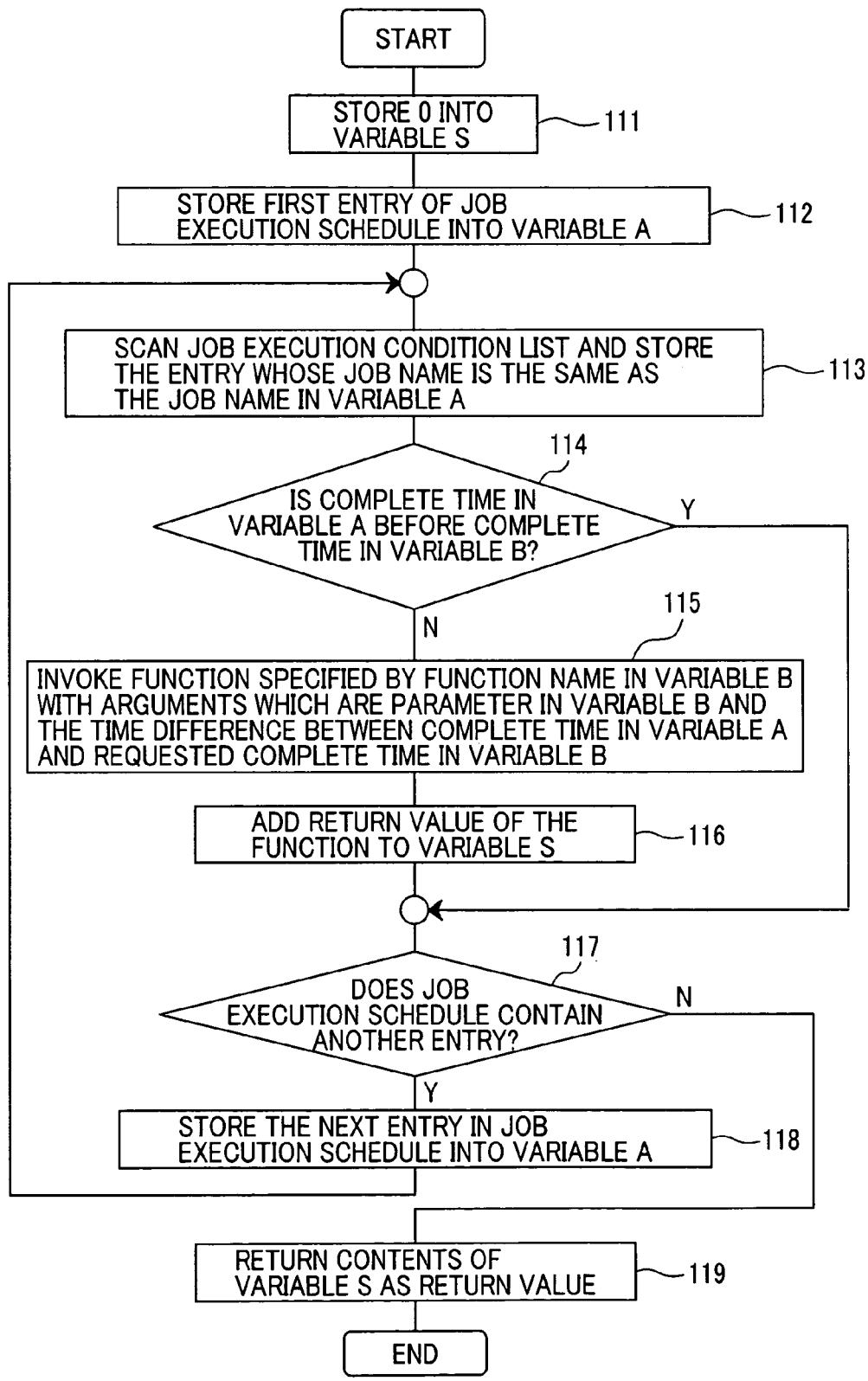

FIG.2

JOB EXECUTION SCHEDULE

200

| JOB NAME 202a | START TIME 203a | COMPLETE TIME 204a | COMPUTER NAME 205a | 201a |
| JOB NAME 202b | START TIME 203b | COMPLETE TIME 204b | COMPUTER NAME 205b | 201b |
| JOB NAME 202c | START TIME 203c | COMPLETE TIME 204c | COMPUTER NAME 205c | 201c |

JOB EXECUTION CONDITION LIST

300

301a

| JOB NAME 302a | REQUESTED COMPLETE TIME 303a | LOSS EVALUATION FUNCTION 304a | PARAMETER 305a |

301b

| 302b | 303b | 304b | 305b |
|---|---|---|---|
| "JOB A" | "04:00AM" | "MULTIPLY 100,000,000 TO DELAY, AND ADD PARAMETER TO IT AND RETURN IT AS AMOUNT OF LOSS" | "50,000,000" |

301c

| 302c | 303c | 304c | 305c |
|---|---|---|---|
| "JOB B" | "06:00AM" | "RETURN PARAMETER AS AMOUNT OF LOSS REGARDLESS OF DELAY" | "50,000,000" |

⋮

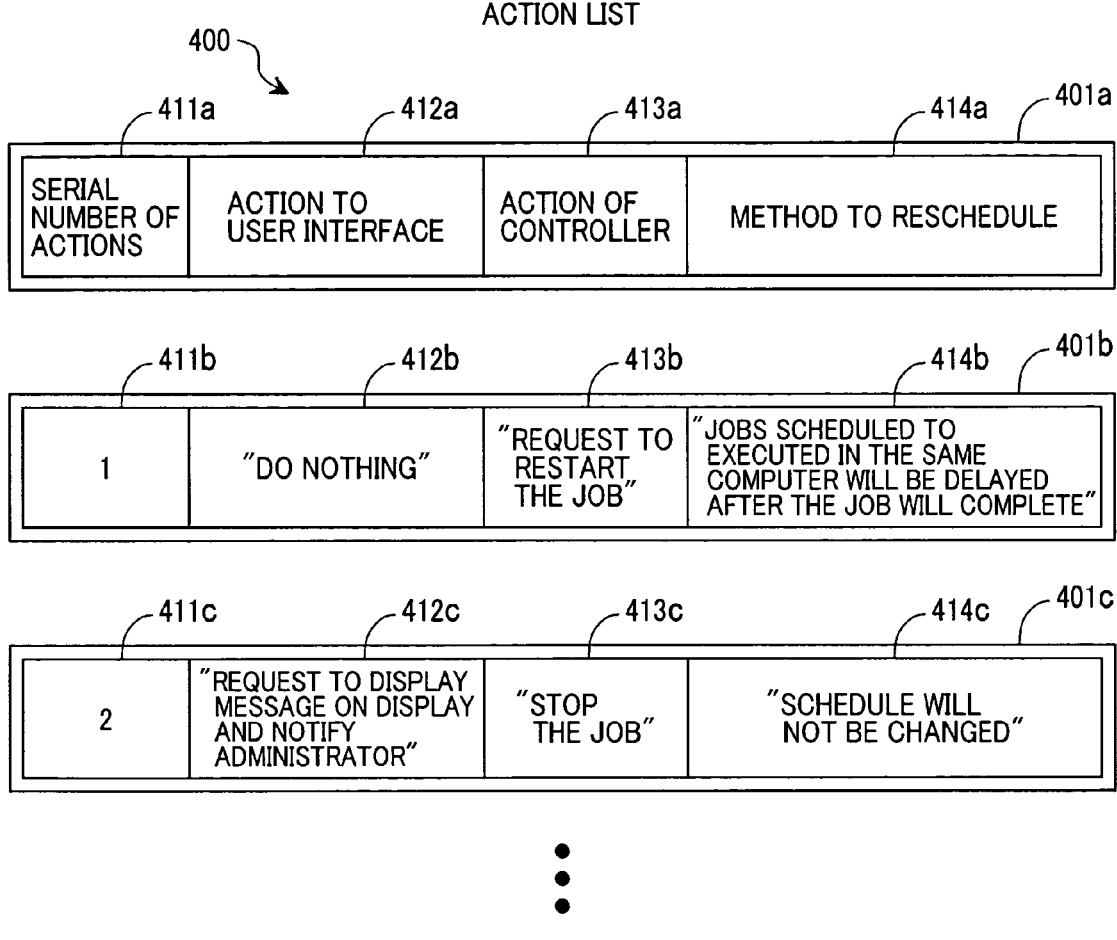

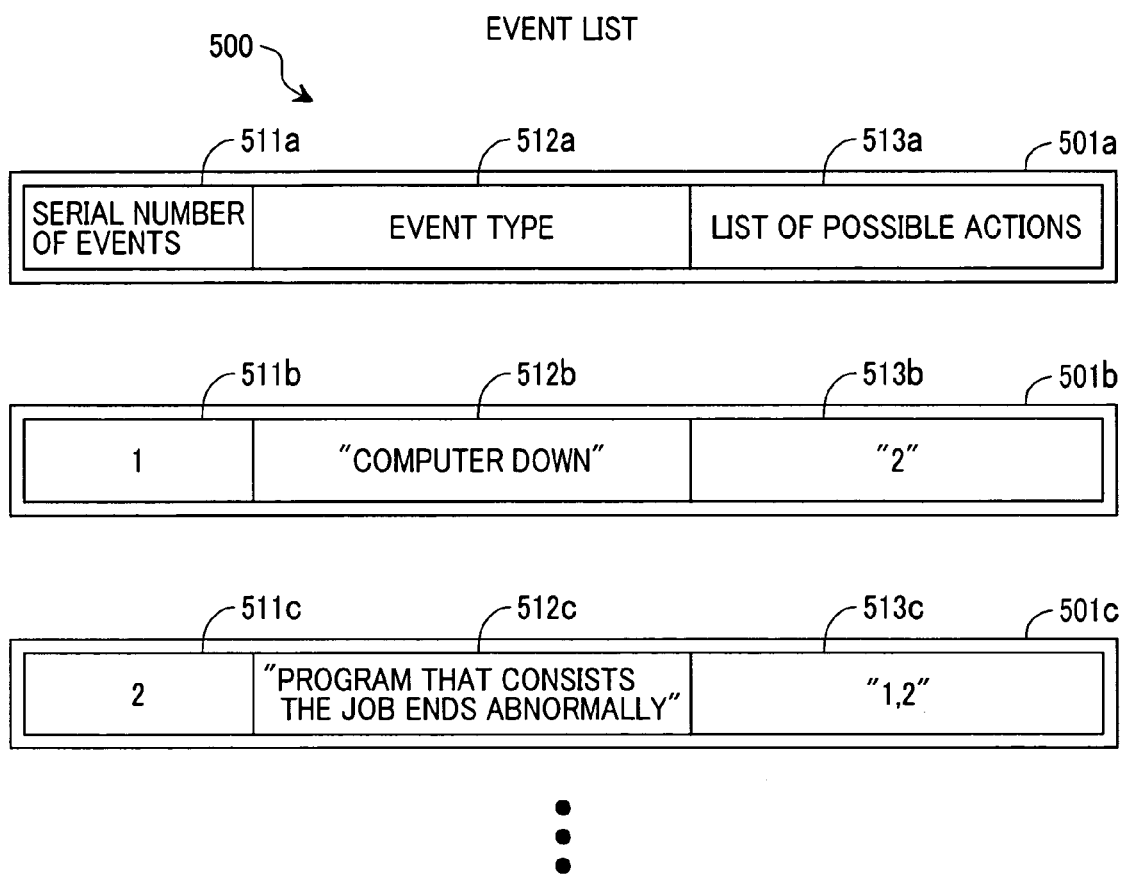

METHOD FOR GENERATING POLICY RULES AND METHOD FOR CONTROLLING JOBS USING THE POLICY RULES

BACKGROUND OF THE INVENTION

The present invention relates to information processing systems and more particularly, to an information processing system having a plurality of computers which utilize a network. More specifically, the invention is concerned with a method for managing jobs executed in the information processing system. To describe more concretely, the invention pertains to a method for automatically executing the administration such as re-execution of a running job by using a policy rule in the event that such an event as a fault takes place in the information processing system executing the job.

In an information processing system described in U.S. Pat. No. 6,504,621, a method is described in which policy rules are set in a job manager for managing execution of jobs to automatically execute the administration in the event that such an event as a fault takes place.

According to this reference, the job manager for management of jobs is provided in the information processing system and a user about to execute a job designates "an action to be taken when a fault takes place in the course of execution of the job" as a policy rule when inputting the job into the job manager. As the action, "re-execute the same job" or "make contact with the user", for instance, can be designated. In the event that hardware or software becomes faulty in the information processing system and the execution of a job ends abnormally, the job manager consults the policy rule to automatically execute the action designated by the user. In this manner, the job manager can automatically execute the administration when an event such as a fault takes place during execution of the job.

SUMMARY OF THE INVENTION

More particularly, policy rules to be designated job by job are designated regardless of another job and occurrence time of a fault and therefore, it will be necessary for an information processing system and an enterprise utilizing the information processing system to provide a system which does not fail to perform optimum automatic administration. This will be described concretely by using a simplified example.

As an example, an information processing system comprised of only one computer will be considered. It is now assumed that two jobs A and B are inputted into the information processing system, with the job A occupying the computer so as to be in execution and the job B having an execution start time designated in advance and awaiting for execution until the time is up. In this case, if a policy for job A reading "re-execute the job A when the job ends abnormally in the course of execution" is designated, the job A will be re-executed to delay complete time of job A accordingly. In case the complete time of job A is later than the start time of job B, the job B cannot be started at the designated start time because the job A occupies the computer. If in that case the job B is a job for which punctuality of the complete time is stringent, the information processing system managed to take charge of the execution of both job A and job B encounters a serious problem.

Conversely, it is assumed that by taking the importance of the succeeding job B into account, a policy reading "when the job ends abnormally during execution thereof, discard the job without re-executing it" is set for the job A to be executed precedently. If a fault occurs immediately after start of job A and the job A ends abnormally, the job A will not be executed.

Then, if the job A had been restarted, the job A could have been ended earlier than the start time of job B. Under such an assumption, the information processing system has wasted the time roomed for the computer by making the job A unexecuted.

As will be seen from the above example, the policy rule is designated in the prior art regardless of the status of another job (in this example, the start time of job B) and the time of occurrence of a fault (in this example, the time that the job A ends abnormally) and as a result, the optimum automatic administration cannot sometimes be fulfilled throughout the information processing system. In the above example, only one computer is employed for execution of jobs and the two jobs are inputted but the same problem will occur even in an information processing system having many job executable computers and many inputted jobs.

Accordingly, a first object of the present invention is to provide a method for generating policy rules which is adapted for a job manager to perform optimum automatic administration throughout an information processing system.

A second object of the invention to provide a method for generating policy rules which is adapted for a job manager to perform such carefully thought out, optimum automatic administration that can always minimize the amount of loss throughout an information processing system by taking the occurrence time and type of an event such as a fault into account.

According to the invention, policy rules for individual jobs are set through the following method not by input persons of the individual jobs but by a system manager of information processing system.

Firstly, in respect of individual jobs to be executed, requested complete times and amounts of loss incurred in the event that the complete times exceed themselves or the jobs cannot be executed. In addition, there are prepared a list of types of possible faults occurring in the information processing system and a list of possible or adoptable actions.

With this construction, when a fault takes place in a job at a time at which the job is running or in execution and then an action is taken, complete times of the individual jobs can be estimated. Further, by using the estimated complete times of the individual jobs, a total of amounts of loss incurred in such an event can be calculated.

Then, by calculating every total loss amounts for individual action adoptable in a combination of a time (T), a job (J) being executed at that time and a type (X) of fault, an action (A) for which the total loss amount is minimized is determined to thereby determine, as one policy rule for the job J, a policy rule reading "execute the action A when the fault X occurs at the time T". By executing a similar procedure in respect of all combinations of time Tm, job J running at the time T and type X of fault, a set of policy rules can be obtained for all types of faults occurring in all jobs at all times. The system manager of information processing system sets the thus obtained set of policy rules in the job manager.

According to the method of the invention, the policy rules for always minimizing the loss amount in the whole of the information processing system can be set. Accordingly, the job manager can perform optimum automatic administration throughout the information processing system.

BRIEF DESCRIPTION OF THE DRAWINGS

FIG. 1 is a flowchart showing a method for calculating the amount of loss in an embodiment of the invention.

FIG. 2 is a diagram showing structure and contents of a job execution schedule 200 in the embodiment of the invention.

FIG. 3 is a diagram showing structure, contents and concrete examples of a job execution condition 300 in the embodiment of the invention.

FIG. 4 is a diagram showing structure, contents and concrete examples of an action list 400 in the embodiment of the invention.

FIG. 5 is a diagram showing structure, contents and concrete examples of an event list 500 in the embodiment of the invention.

DESCRIPTION OF THE EMBODIMENTS

Embodiments of the present invention will now be described by way of example with reference to the accompanying drawings.

(1) Hardware Construction of Policy Rule Generation Environment

Figure 10:
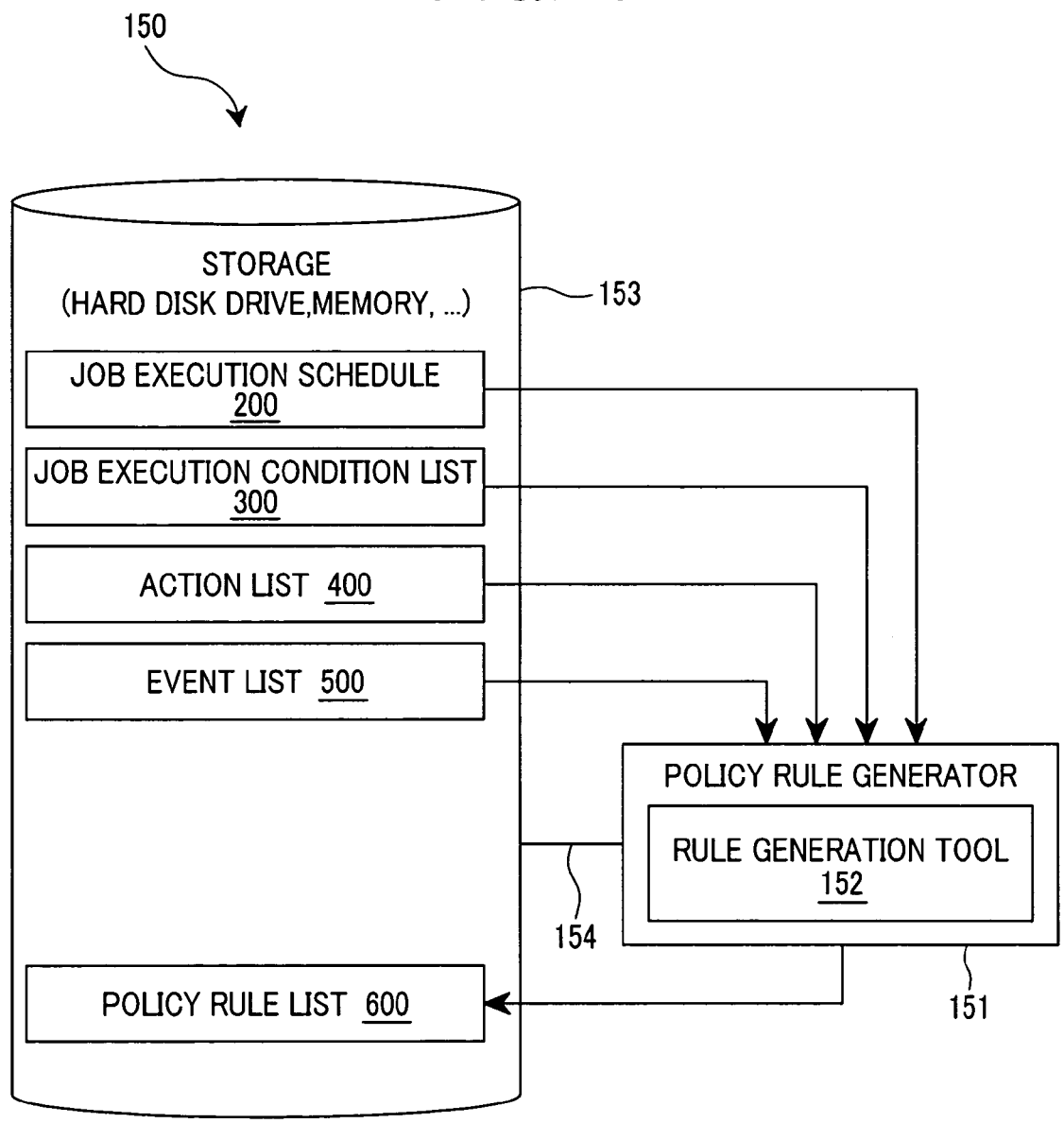
FIG. 10 is a diagram showing the construction of a policy rule generation environment for generation of the policy rules in the embodiment of the invention.

In the present embodiment, generation of policy rules according to the invention is carried out when a system manager of information processing system executes a policy rule generation method of the invention in a policy rule generation environment using a policy rule generator. Referring to FIG. 10, the hardware construction of a policy rule generation environment in this embodiment will be described. The policy rule generation environment, generally designated by reference numeral 150, comprises a policy rule generator 151 and a storage 153. Practically, the policy rule generator 151 is a computer such as a terminal, personal computer or a main frame having one or more processors and executes a policy generation tool 152 packaged or mounted with a process for generation of policy rules. The processors are not illustrated. The storage 153 is a memory medium such as a hard disk drive, memory, file server or network information server and can store such data as job execution schedule 200, job execution condition list 300, action list 400, event list 500 and policy rule list 600. The storage 153 is connected to the policy rule generator 151 by way of a link 154. The link 154 is a connection cord or a wireless or wire network. It will be appreciated that in FIG. 10, the job execution schedule 200, job execution condition list 300, action list 400, event list 500 and policy rule list 600 are all stored in the storage 153 but practically, they may be stored in separate storages. Also, the policy rule generator 151 may be stored in the same console as the storage 153.

(2) Software Construction of Policy Rule Generation Environment

The software construction of the policy rule generation environment will be described by also making reference to FIG. 10. In FIG. 10, the rule generation tool 152 is a program executed by the processor of policy rule generator 151 and is adapted to execute the policy rule generation method according to the invention. By making a request to an operating system (not shown), being executed on the policy rule generator 151, for input/output, the rule generation tool 152 can read the job execution schedule 200, job execution condition list 300, action list 400 and event list 500 stored in the storage 153 and can write the policy rule list 600 also stored therein.

The job execution schedule 200 (FIG. 2), job execution condition list 300 (FIG. 3), action list 400 (FIG. 4), event list 500 (FIG. 5) and policy rule list 600 (FIG. 6) are data stored in the storage 153 and they store information in formats shown in different Figs., respectively.

In the present embodiment, when desiring to generate policy rules in the information processing system, the system manager of information processing system stores, in advance, the job execution schedule 200, job execution condition list 300, action list 400 and event list 500 in the storage 153 to cause the policy rule generator 151 to execute the policy generation tool 152. The executed policy generation tool 152 reads the job execution schedule 200, job execution condition list 300, action list 400 and event list 500 to execute the policy rule generation method according to the invention and writes the generated policy rules in the policy rule list 600 stored in the storage 153. The system manager of information processing system reads the filled-in policy rule list 600 and applies it to the information processing system.

Further, when any of contents described in the job execution schedule 200, job execution condition list 300, action list 400 and event list 500 is modified as in the case where a new job not described in the job execution schedule 200 is required to be executed or the execution start time of a special job described in the job execution schedule 200 is required to be changed for convenience' sake of business affairs, the system manager of information processing system again executes the policy generation tool 152 to generate a new policy rule list 600 and applies it to the information processing system. The re-execution of the policy generation tool 152 may be done manually by the system manager of information processing system; or the policy rule generation tool 152 or a different program may detect changes in the job execution schedule 200, job execution condition list 300, action list 400 and event list 500 stored in the storage 153 or new reception of a job to automatically call and re-execute the policy rule generation tool 152.

It is to be noted that in the present embodiment the rule generation tool 152 is handled as the program but this does not imply that a function equivalent to the above must be packaged as a program in the present invention.

(3) Job Execution Schedule

Referring to FIG. 2, format and contents of the job execution schedule 200 in the present embodiment will be described. In FIG. 2, the job execution schedule 200 has a table format including one or more lines or entries 201a, 201b, 201c, . . . . Every entry includes four columns. The respective four columns referred to herein include job names 202a, 202b, 202c, . . . , start times 203a, 203b, 203c, . . . , complete times 204a, 204b, 204c, . . . , and computer names 205a, 205b, 205c, . . . . Though not shown, each entry of the job execution schedule 200 may include a column or columns other than the above.

Information stored in the job execution schedule 200 is utilized in the policy rule generation environment in which the policy rule list 600 is generated and in the information processing system for execution of jobs. The information stored in the job execution schedule 200 may be prepared by the system manager of information processing system who receives requests from requesters for execution of individual jobs in the information processing system or in alternative, the information may be prepared by a person in charge different from the system manager and taken over to the system manager who in turn uses the transferred information. Further, the information stored in the job execution schedule 200 may be prepared manually by the system manager or the person in charge or may be prepared by automating part or the whole of work through the use of any tool or utility.

The job execution schedule 200 stores, in respect of the individual jobs executed in the information processing system, execution start time, complete time and name of a computer executing the job in the information processing system. In the case of entry 201a, a name of a job is stored at job name 202a, a start time of the job is stored at start time 203a, a complete time of the job is stored at complete time 204a and a name of a computer for execution of the job is stored at computer name 205a. In a special case, for example, in case an error takes place on the way and restart is not done, so that the job cannot be executed, a value of −1 (minus 1) is stored at complete time 204a. The entries 201b, 201c, . . . are handled similarly.

(4) Job Execution Condition List

Referring to FIG. 3, format and contents of the job execution condition list 300 in the present embodiment will be described. In FIG. 3, the job execution condition list 300 has a table format including one or more entries 301a, 301b, 301c, . . . . Every entry includes four columns. The respective four columns referred to herein include job names 302a, 302b, 302c, . . . , requested complete times 303a, 303b, 303c, . . . , loss evaluation function names 304a, 304b, 304c, . . . , and parameters 305a, 305b, 305c, . . . . Though not shown, each entry of the job execution condition list 300 may include a column or columns other than the above.

Information stored in the job execution condition list 300 is utilized in the policy rule generation environment in which the policy rule list 600 is generated. The information stored in the job execution condition list 300 may be prepared by the system manager of information processing system who receives requests from requesters for execution of individual jobs in the information processing system or in alternative, the information may be prepared by a person in charge different from the system manager and taken over to the system manager who in turn uses the transferred information. Further, the information stored in the job execution condition list 300 may be prepared manually by the system manager or the person in charge or may be prepared by automating part or the whole of work through the use of any tool or utility.

The job execution condition list 300 stores, in respect of the individual jobs executed in the formation processing system, their execution conditions. In the present embodiment, an execution condition of a job is expressed by designating a requested complete time of the job and a method of calculating an amount of loss incurred in the event that the requested complete time is not met. One entry of job execution condition list 300 corresponds to one job and indicates a condition for execution of the job. The contents of one entry will be described by way of example of entry 301a. A name of a job is stored at job name 302a to connect the entry 301a to the particular job. A time at which the job must be completed is stored at requested complete time 303a. An expression for calculating an amount of loss incurred when the job is not completed at the requested complete time 303a is stored at loss evaluation function 304a. In case the job designated by the job name 302a is not completed at the time stored at the requested complete time 303a, this expression is executed together with two arguments to calculate an amount of loss. The two arguments referred to herein are a difference (delay time) between a complete time of the job and the time described at the requested complete time 303a and a value stored at parameter 305a. In the present embodiment, the delay time is indicated in a unit of hour but other units (for example, minute) may be used. It is assumed that in a special case where the job cannot be executed, the delay time is −1 (minus 1). As the expression to be stored at loss evaluation function 304a, either only a function name to be called or a subroutine described in any programming language may be stored.

The entries 301b, 301c, . . . in FIG. 3 are handled similarly to the entry 301a. Concrete examples of job execution condition are indicated at entries 301b and 301c in FIG. 3. According to an execution condition described in the entry 301b, when a job named by job A is completed at 5 a.m. which is later than a requested complete time of 4 a.m. (described at 303b), an expression described at 304b is called together with arguments of a delay time of one hour and a parameter of 500,000 and a loss amount of 1,500,000 is calculated. According to an execution condition described in the entry 301c, when a job named by job B is completed at 7 a.m. which is later than a requested complete time of 6 a.m. (described at 303c), an expression described at 304c is called and the amount of loss is 500,000. It will be appreciated that in both the cases of loss evaluation functions 304b and 304c, the delay time taken over as an argument is first examined as to whether to be −1 (minus 1) before applying the aforementioned expressions and if so, a process may be taken to apply a different expression.

(5) Action List

Referring now to FIG. 4, format and contents of the action list 400 in the present embodiment will be described. In FIG. 4, the action list 400 has a table format including one or more entries 401a, 401b, 401c, . . . . Every entry includes four columns. The respective four columns referred to herein include serial numbers 411a, 411b, 411c, . . . , actions to user interface 412a, 412b, 412c, . . . , actions to controller 413a, 413b, 413c, . . . , and rescheduling methods 414a, 414b, 414c, . . . . Though not shown, each entry may include a column or columns other than the above.

Information stored in the action list 400 is utilized in the policy rule generation environment in which the policy rule list 600 is generated and in the information processing system for executing jobs. The information stored in the action list 400 may be prepared by the system manager of information processing system or may be prepared by a designer in the course of designing the information processing system. Further, the information stored in the action list 400 may be prepared manually by the system manager or designer or may be prepared by automating part or the whole of work through the use of any tool or utility.

Figure 6:
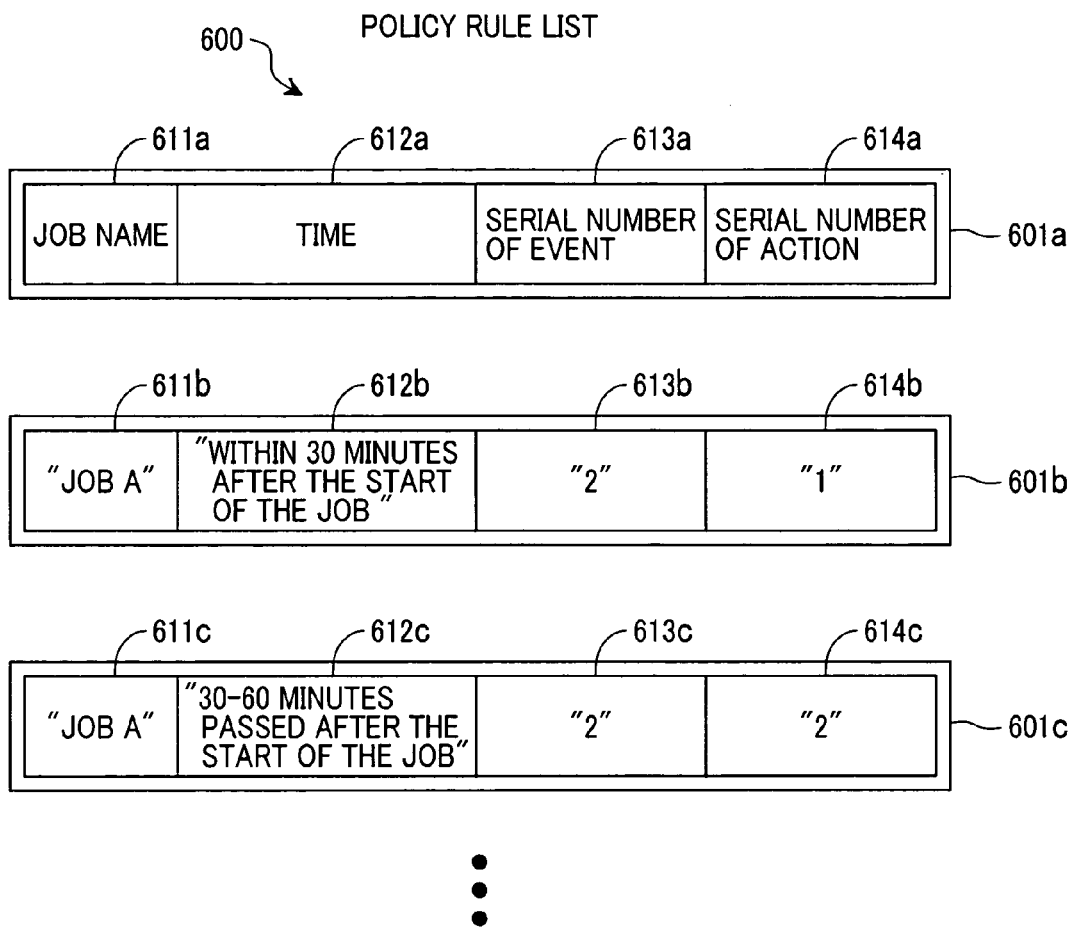
FIG. 6 is a diagram showing structure, contents and concrete examples of a policy rule list 600 in the embodiment of the invention.

Enumerated in the action list 400 are all candidates for possible actions adoptable when an event such as a fault occurs in the information processing system. One entry in action list 400 corresponds to one action and indicates the contents thereof. The contents described in the action is designated along with the type of event and the time in the policy rule list (FIG. 6) and is executed when an event of a designated type occurs at a designated time in the information processing system. The contents of one entry as above will be described by way of example of entry 401a. A definitely or uniformly determined serial number in the action list is allotted to serial number 411a. For allotment of serial numbers, any method can be employed provided that definitely determined numbers can eventually be allotted to the entries 401a, 401b, 401c, . . . , respectively. The serial number 411a is used for designating a special action in the event list (FIG. 5) and policy rule list (FIG. 6). A process carried out in a user interface (FIG. 9) when this action is executed is designated at action 412a to user interface. In this process, it is designated whether making contact with the system manager of information processing system is needed and what kind of method is used if the contact is necessary. A concrete form stored at the action 412a to user interface may be either only a function name to be called or a subroutine described in any programming language. Designated at action 413a to controller is a process carried out in a controller (FIG. 9) when this action is executed. In this process, whether a job in execution is re-executed or whether re-execution is done with the same computer is designated. A concrete form stored at the action 413a to controller may be either only a function name to be called or a subroutine described in any programming language. At rescheduling method 414a, how the job execution schedule 200 is modified as a result of taking this action is described. For example, in this method, a process is designated in which start times of all jobs scheduled to be executed with the same computer after the execution of this job are delayed. A concrete form stored at the rescheduling method 414a may be either only a function name to be called or a subroutine described in any programming language.

The entries 401b, 401c, . . . in FIG. 4 may be handled similarly to the entry 401a. In FIG. 4, concrete examples of actions are indicated in the entries 401b and 401c. When an action described in the entry 401b is executed, any process is not taken for making contact with the system manager in the user interface (FIG. 9) under the direction of a process described at the action 412b to user interface, the controller (FIG. 9) executes a process of immediately re-executing a job subject to the occurrence of an event under the direction of a process described at the action 413b to controller, and the job execution schedule 200 is modified such that start times of all jobs scheduled to be executed with the same computer after the job subject to the event occurrence are delayed. Further, when an action described in the entry 401c is executed, a process of making contact with the system manager is executed in the user interface under the direction of a process described at the action 412c to user interface, the controller executes a process of stopping the job subject to the event occurrence under the direction of a process described at the action 413c to controller, and the job execution schedule 200 is not modified under the direction of a process described at the rescheduling method 414c.

(6) Event List

Referring to FIG. 5, format and contents of the event list 500 in the present embodiment will be described. In FIG. 5, the event list 500 has a table format including one or more entries 501a, 501b, 501c, . . . . Every entry includes three columns. The respective three columns referred to herein include serial numbers 511a, 511b, 511c, . . . , event types 512a, 512b, 512c, . . . and lists of possible actions 513a, 513b, 513c, . . . . Though not shown, each entry in the event list 500 may include a column or columns other than above.

In the event list 500, all possible events such as faults occurring in the information processing system are enumerated. One entry in the event list 500 corresponds to one event and indicates the contents thereof. The contents described in an event is designated in the policy rule list (FIG. 6), along with an action and time.

The contents of one entry will be described by taking entry 501a, for instance. A serial number determined definitely in the event list 500 is allotted to serial number 511a. For allotment of serial numbers, any method can be employed provided that the entries 501a, 501b, 501c, . . . are eventually allotted with definitely determined serial numbers. The serial number 511a is used for designating a special action in the policy rule list (FIG. 6). Stored at fault event type 512a is a type of an event corresponding to the entry 501a. The event type is to represent a case where the computer becomes down or a case where a program constituting a job ends abnormally. Stored at list 513a of possible actions is a serial number in the action list 400, which list includes possible actions adoptable in the case of the occurrence of the event described in the entry 501a.

The entries 501b, 501c, . . . in FIG. 5 are handled similarly to the entry 501a. In FIG. 5, concrete examples of events are indicated in the entries 501b and 501c. An event described in entry 501b is allotted with a serial number of 1 as described at serial number 511b and according to the contents described at fault event type 512b, this event is so designated as to indicate an instance where the computer becomes down. Further, according to the contents descried at possible action list 513b, a possible action adoptable in the event of the occurrence of this event is limited to the action described in the entry 401c in action list 400 (do not re-execute the job and make contact with the system manager). In addition, an event described in entry 501c is allotted with a serial number of 2 as described at serial number 511c and according to the contents described at fault event type 512c, this event is so designated as to indicate an instance where the job in execution ends abnormally. Further, according to the contents described at possible action list 513c, a possible action adoptable in the case of the occurrence of this event is so designated as to be limited to either the action described in the entry 401b in action list 400 (re-execute the job with the same computer and delay execution times of jobs to be executed after the job) or the action described in the entry 401c (do not re-execute the job and make contact with the system manager).

Information stored in the event list 500 is utilized in the policy rule generation environment in which the policy rule list is generated and in the information processing system for executing jobs. The information stored in the event list 500 may be prepared by either the system manager of information processing system or by a designer in the course of designing the information processing system. Further, the information stored in the event list 500 may be prepared manually by the system manager or designer or may be prepared by automating part or the whole of work through the use of any tool or utility.

(7) Policy Rule List

Referring to FIG. 6, format and contents of the policy rule list 600 in the present embodiment will be described. In FIG. 6, the policy rule list 600 has a table format including one or more entries 601a, 601b, 601c, . . . . Each entry includes four columns. The respective four columns referred to herein include job names 611a, 611b, 611c, . . . , times 612a, 612b, 612c, . . . , events 613a, 613b, 613c, . . . , and actions 614a, 614b, 614c, . . . . Though not shown, each entry in the policy rule list 600 may include a column or columns other than the above.

As has already been described with reference to FIG. 10, the policy rule list 600 is generated by means of the rule generation tool 152. The policy rule list 600 is utilized in the information processing system for executing jobs.

In the policy rule list 600, a set of policy rules reading "when an event occurs at a time during execution of a particular job, which action is taken for the job" are enumerated. One entry in the policy rule list 600 corresponds to one policy rule.

The contents of one entry will be described using entry 601a as an example. At job name 611a, a job name of a job to which this policy rule is applied is stored. At time 612a, a time at which this policy rule becomes effective is stored. In the present embodiment, the time is stored at time 612a in terms of a time zone as viewed from a start time of the job to which this policy rule is applied. But, the time may be stored at time 612a in another temporal form, for example, in terms of absolute time. Designated at event 613a is an event for which this policy rule is effective. More specifically, a serial number of a special event indicated in the event list (FIG. 5) is stored at the event 613a. Designated at action 614a is an action executed in this policy rule.

The entries 601b, 601c, ... in FIG. 6 are handled similarly to the entry 601a. In FIG. 6, concrete examples of events are indicated in the entries 601b and 601c. According to the contents described at job name 611b, time 612b, event 613b and action 614b, an event described in the entry 601b implies a policy rule reading "If, in job A, a program constituting the job A ends abnormally within 30 minutes after start of the job, re-execute the job A with the same computer immediately and delay execution start of succeeding jobs scheduled to be executed with the same computer". According to the contents described at job name 611c, time 612c, event 613c and action 614c, an event described in the entry 601c implies a policy rule reading "If, in job A, a program constituting the job A ends abnormally within 60 minutes following 30 minutes after start of the job, stop execution of the job A and make contact with the system manager".

(8) Method for Generation of Policy Rules

Figure 7:
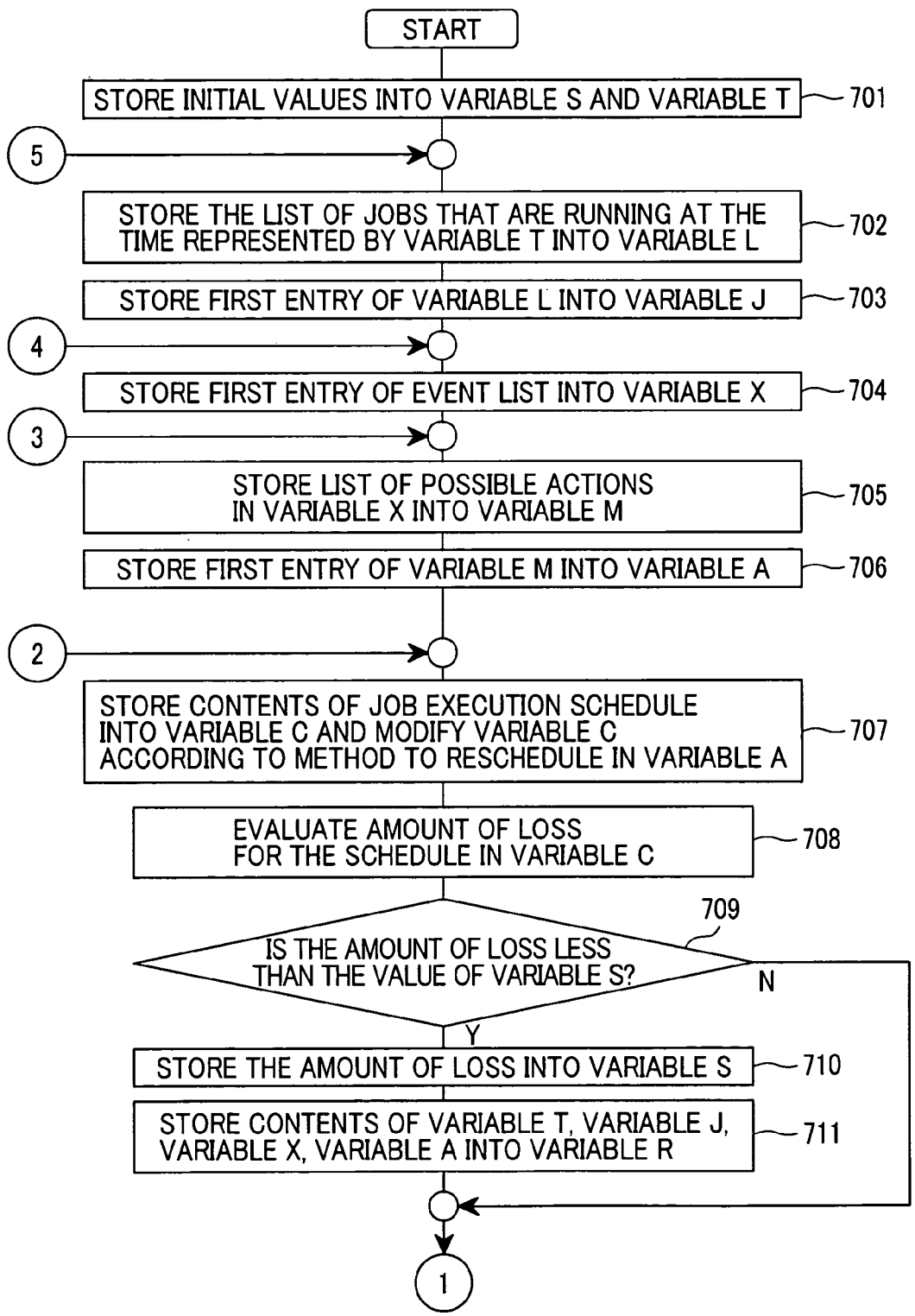
FIG. 7 is a flowchart showing a policy rule generation method in the embodiment of the invention, continuing to FIG. 8.
Figure 8:
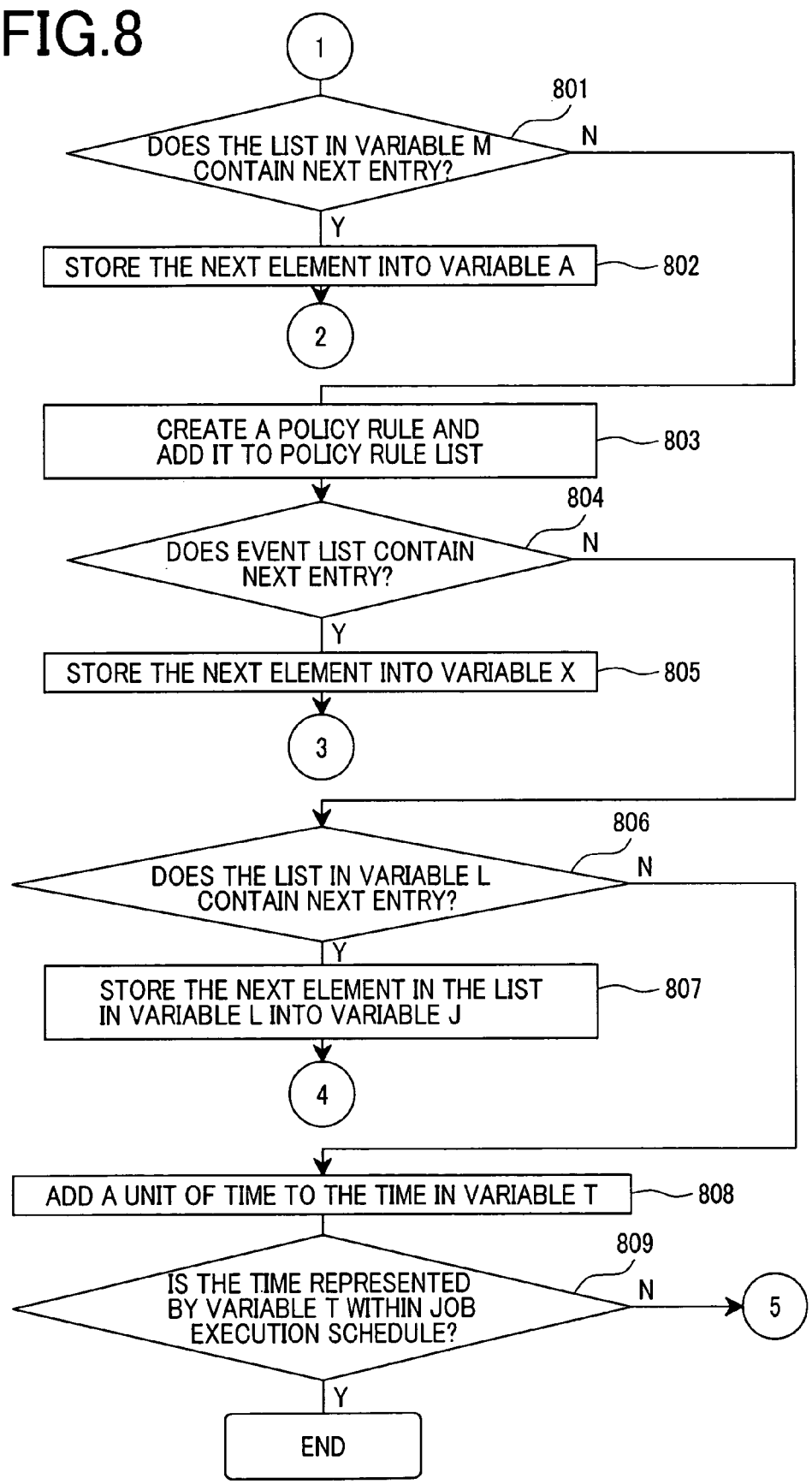
FIG. 8 is a flowchart continued from FIG. 7 to show the policy rule generation method in the embodiment of the invention.

Referring now to FIGS. 7 and 8, a method for generating policy rules in the present embodiment will be described. In the present embodiment, the policy rule generation method shown in FIGS. 7 and 8 is executed when the manager of information processing system executes the rule generation tool 152 of FIG. 10.

The rule generation tool 152 called by the system manager first initializes values of two variables S and T (701). The value of S is set to a very large amount of money. For example, an annual budget of an organ managing an information processing system or of a country in which the information processing system is installed may be used or a capital of the organ may be used. The value of T is set to a time at which execution of the first job is started in the information processing system. The time that the initial job is executed can be determined easily by scanning the job execution schedule 200.

Next, the rule generation tool 152 scans the job execution schedule 200 to prepare a list of names of jobs running at the time described in variable T, stores the list in variable L (702) and besides stores, in variable J, the first entry of the listed variable L (703).

Next, the rule generation tool 152 reads the event list 500 (FIG. 5) and stores the contents of the first entry of the event list 500 in variable X (704).

Next, the rule generation tool 152 takes out a list of possible actions from the contents of variable X (the contents of one entry of the event list 500 is stored) to stores it in variable M (705) and further takes out the first entry of the listed variable M. Since the entry in question is one of serial numbers in the action list 400 (FIG. 4), the rule generation tool 152 scans the action list 400 and reads an entry in action list 400 having a serial number of that entry to store it in variable A (706).

Subsequently, the rule generation tool 152 reads and writes the job execution schedule 200 into variable C, takes out a rescheduling method from the contents of the variable A (one entry in action list 400, that is, one action) and modifies the job execution schedule stored in the variable C in accordance with the taken-out rescheduling method (707). For example, when a subroutine (described with any programming language) is stored as the rescheduling method, a processing system of the programming language is called by using, as arguments, the contents of variable C, job name stored in the variable J and time stored in the variable T and the subroutine is executed. As a result of step 707, the contents of variable C changes from the contents of the original job execution schedule 200 in the start time, complete time and computer name of each entry in the job execution schedule. In particular, when the contents of variable A is designated such that the job is not re-executed, the complete time is −1 (minus 1) in an entry having the job name stored in the variable J.

Thereafter, the rule generation rule 152 examines whether individual jobs described in the job execution schedule stored in the variable C meet requested complete times and if any unmeet jobs are present, calculates amounts of loss due to the unmeetness and totalizes the amounts of loss (708). A more specified method for calculation of the loss amount will be described later with reference to FIG. 1.

Next, the rule generation tool 152 compares the calculated loss amount with the value stored in the variable S to determine whether the former is smaller than the latter (709). If smaller, the calculated loss amount is stored in the variable S (710) and the contents of variables T, J, X and A are stored in the variable R (711). If not smaller, both the steps 710 and 711 are not executed. It is to be noted that if the calculated loss amount is 0 (zero) in the step 711, the program may jump to step 804 (FIG. 8).

Next, the rule generation tool 152 examines whether the next entry (serial number of action) is present in the list stored in the variable M (801) and if nonexistent, the program jumps to step 803. If existent, the action list 400 is scanned as in the case of the step 706 to read an entry of action list 400 having a serial number of that entry and store it in the variable A (802). Then, the program jumps to the step 707.

Thereafter, the rule generation tool 152 prepares a policy rule (one entry of the policy rule list 600) from the contents stored in the variable R and adds it to the policy rule list 600 (803). Specifically, since the contents of variables T, J, X and A for minimizing the loss amount is stored in the variable R, a policy rule is prepared by setting a job name stored in a portion corresponding to variable J in the variable R to the job name in the policy rule, a difference between the time stored in a portion corresponding to variable T in the variable R and the start time of that job stored in the job execution schedule to the time in the policy rule, a serial number of an event stored in a portion corresponding to variable X in the variable R to the event in the policy rule and a serial number of an action stored in a portion corresponding to variable A in the variable R to the action in the policy rule.

Next, the rule generation tool 152 reads the event list 500 to examine whether an entry next to the entry having its serial number stored in the variable X (stored with the contents of one entry in the event list 500) is present (804) and if nonexistent, the program jumps to step 806. If existent, the contents of the next entry is stored in the variable X (805) and the program jumps to the step 705.

Subsequently, the rule generation tool 152 examines whether an entry next to the entry corresponding to the job name stored in the variable J is present in the list of job names stored in the variable L (806) and if nonexistent, the program jumps to step 808. If existent, the contents (job name) of the next entry is stored in the variable J (806) and the program jumps to the step 704.

Next, the rule generation tool 152 advances the time stored in the variable T by one unit (808). As the unit of advancement of the time, a unit (for example, 1 minute, 30 minutes or 1 hour) may be used by which the system manager of information processing system determines the start times of the individual jobs when preparing the job execution schedule 200.

Next, the rule generation tool 152 scans the job execution schedule 200 to examine whether any jobs running at the time stored in the variable T are present (809) and if existent, the program jumps to the step 702. If nonexistent, the rule generation tool 152 is ended.

According to the method described with reference to FIGS. 7 and 8, the rule generation tool 152 can calculate a total of loss amounts for individual actions adoptable in a combination of a time (T), a job (J) being executed at that time and a type (X) of fault and determine an action (A) for which the total of loss amount is minimized to thereby determine, as one policy rule for the job T, a policy rule reading "execute the action A when the fault X occurs at the time T". In addition, by executing a similar procedure in respect of all combinations of time T, job J running at the time T and type X of fault, the policy rule generation tool 152 can generate a set of policy rules for all types of faults occurring in all jobs at all times to store the set in the policy rule list 600.

(9) Calculation Method of Loss Amount

Referring now to FIG. 1, a method for calculating an amount of loss in the rule generation tool 152 will be described. In the present embodiment, a flowchart shown in FIG. 1 is packaged as a subroutine (called a loss amount calculation routine) which can be called from the rule generation tool 152. Individual variables in the loss amount calculation routine are managed independently of the individual variables in FIGS. 7 and 8. The loss amount calculation routine is called in the rule generation tool 707 (FIG. 7) by using the variable C (modified job execution schedule) as an argument.

Firstly, the loss amount calculation routine stores 0 (zero) in the variable S (111). Subsequently, a heading entry in the job execution schedule taken over as the argument is stored in the variable A (112).

Thereafter, the loss amount calculation routine scans the job execution condition list 300 to acquire an entry of job execution condition list 300 having the same job name as that stored in the variable A and stores it in variable B(113).

Next, the loss amount calculation routine examines whether a complete time stored in the variable A is earlier than a requested complete time stored in the variable B and whether the complete time stored in the variable A is not −1 (minus 1) (114) and if so, the program jumps to step 117. If not so, the following step 115 is executed.

Next, the loss amount calculation routine calculates a delay time on the basis of a difference between the complete time stored in variable A and the requested complete time stored in variable B. In a special case where the complete time stored in variable A is −1 (minus 1), the delay time is defined to be −1 (minus 1). Next, the loss amount calculation routine calls a loss evaluation function stored in the variable B by using, as arguments, the calculated delay time and a parameter stored in the variable B (115). For example, in case a subroutine (described in any programming language) is stored as the loss evaluation function, a processing system of the programming language is called to execute the subroutine.

Next, the loss amount calculation routine adds a return value of the loss evaluation function called in the step 115 to the variable S (116).

Subsequently, the loss amount calculation routine examines whether the next entry is present in the job execution schedule taken over as the argument (117) and if the next entry exists, stores the contents of that entry in the variable A (118) and returns to the step 113. If the next entry does not exist, the contents of variable S is returned as a return value of the loss amount calculation routine (119), thus ending the routine.

By calling the loss amount calculation routine shown in FIG. 1, the rule generation tool 152 can examine whether the individual jobs described in the job execution schedule stored in the variable C meet the requested complete times and if any unmeet jobs exist, can calculate amounts of loss due to the unmeetness to calculate a total of the loss amounts.

(10) Construction of Information Processing System

Figure 9:
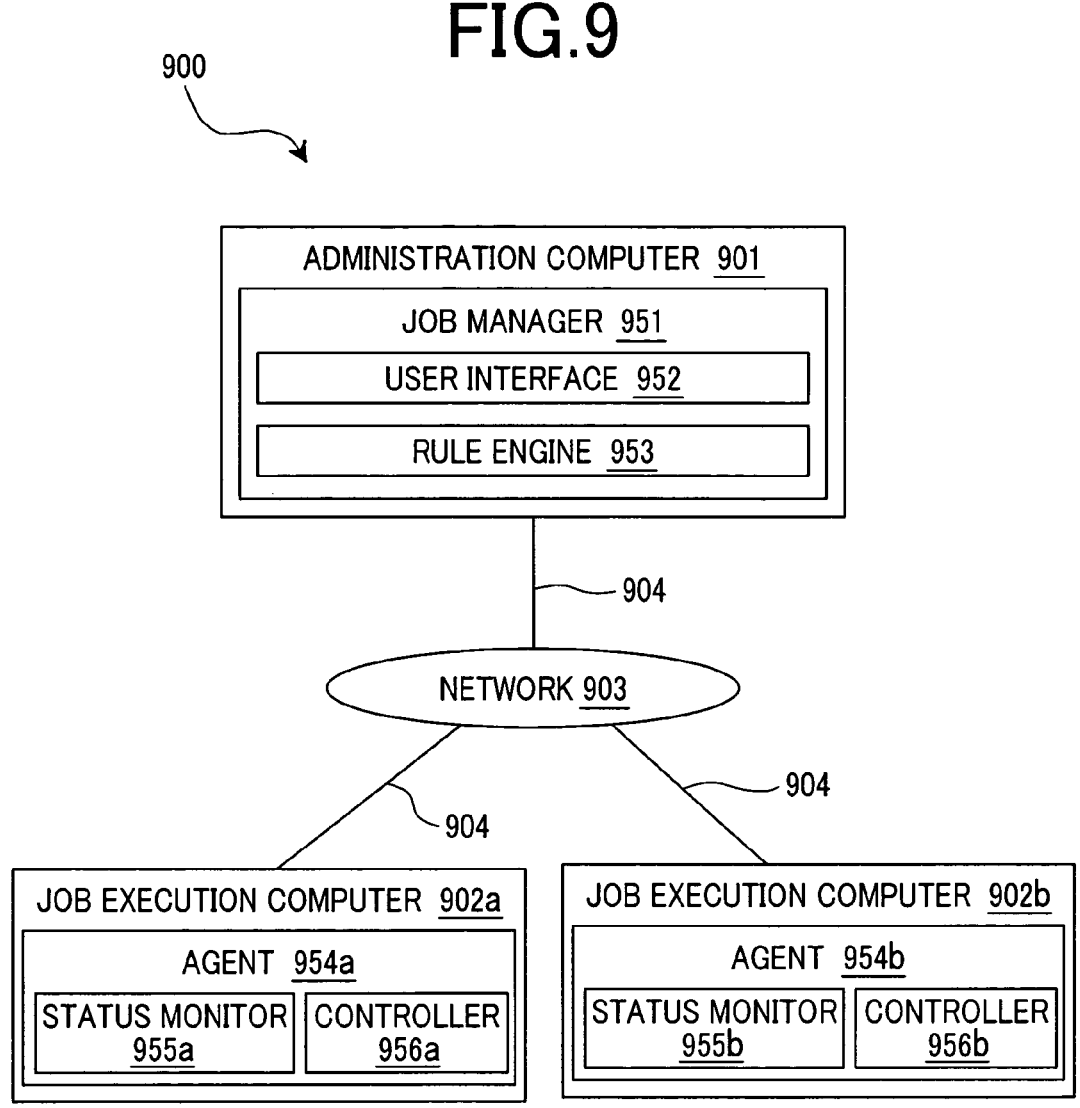
FIG. 9 is a diagram showing the construction of an information processing system for execution of jobs in the embodiment of the invention.

Referring to FIG. 9, the construction of the information processing system, generally designated by reference numeral 900, for executing jobs in the present embodiment. The policy rule 600 prepared using the rule generation tool 152 in the policy rule generation environment 150 (FIG. 10) is used for automatically executing administration in the event that an event such as a fault takes place during job execution in the information processing system 900.

The information processing system 900 of FIG. 9 comprises an administration computer 901, job execution computers 902a and 902b, and a network 903. The administration computer 901 administers jobs executed in the information processing system. The job execution computers 902a and 902b share execution of jobs described in the job execution schedule (FIG. 2). Although not shown, the administration computer 901 and job execution computers 902a and 902b have each one or more processors and they can execute programs. In FIG. 9, the two job execution computers 902a and 902b are provided but in the present embodiment, the provision of three or more job execution computers does not matter. Further, the system manager of information processing system allots definitely determined computer names to the administration computer 901 and job execution computers 902a and 902b, respectively. Two or more of the administration computer 901 and job execution computers 902a and 902b may be installed in the same console.

The administration computer 901 and job execution computers 902a and 902b are connected to the network 903 by using links 904. The link 904 may be of wire or wireless connection type and may include a sub-network. Alternatively, the administration computer 901 and job execution computers 902a may be connected to the network 903 through different connection types, respectively.

In the administration computer 901, a job manager 951 is executed as a program. The job manager 951 executes a process of administering jobs executed in the information processing system 900. Though not shown, the job execution schedule 200, action list 400, event list 500 and policy rule 600 in the policy rule generation environment 150 (FIG. 10) are read and written into the job manager 951 and used for administration of jobs. Though not shown, the job manager 951 has a function of reading the job execution schedule 200, action list 400, event list 500 and policy rule 600 under the command of the system manager of information processing system 900.

The job manager 951 includes a user interface 952 and a rule engine 953. When an event such as a fault occurs in the information processing system 900, the user interface 952 is called from the rule engine 953 in accordance with a policy rule to make contact with the manager of information processing system. The rule engine 953 reads the policy rule list 600, waits for delivery of an event notice message from status monitors of agents 954a and 954b through the medium of the network 903 and when receiving the event notice message, it retrieves the read policy rule list 600 to take out a policy rule corresponding to the delivered event notice message and executes an action described in the policy rule.

In the job execution computers 902a and 902b, the agents 954a and 954b are executed as programs, respectively. The agents 954a and 954b include the status monitors 955a and 955b and controllers 956a and 956b, respectively.

The agents 954a and 954b communicate with the job manager 951 via the network 903 and under the command of the job manager 951, execute a process of executing, stopping and restarting jobs in the job execution computers 902a and 902b. In the event that an event such as a fault takes place in the job execution computers 902a and 902b during execution of jobs or before or after the execution, the agents 954a and 954b transmit an event notice message to the job manager 951. Though not shown, the event notice message includes computer name of a job execution computer subject to the occurrence of the fault (as described previously, each of the job execution computers is allotted with the definitely determined computer name), time of the occurrence of the event and type of the event. The type of the event referred to herein corresponds to any one of event types described in the event list 500.

More specifically, when an event such as a fault takes place in the job execution computer 902a, the status monitor 955a of agent 954a transmits an event notice message to the job manager 951. On the other hand, the controller 956a receives a command transmitted from the job manager 951 via the network and in accordance with the command, it executes, by using the processor of job execution computer 902a, a process for job administration of starting execution of a designated job, stopping the job being executed in the job execution computer 902a or re-executing the designated job in the job execution computer 902a. The agent 954b and the status monitor 955b and controller 956b included in the agent 954b function similarly to the agent 954a and the status monitor 955a and controller 956a, respectively.

In the present embodiment, the job manager 951 and agents 954a and 954b are described as taking the form of programs but this does not mean that part or the whole of them must be in the form of programs. For example, in order to detect a down status of the job execution computer 902a and transmit an event notice message to the job manager 951, part or the whole of the status monitor 955a of agent 954a may be implemented with hardware connected to the job execution computer 902a through any type of system (or alternatively, through the network 903) with a view to permitting the event notice message to be transmitted even when the job execution computer 902a becomes down.

(11) Utilization of Policy Rules in Information Processing System

Referring again to FIG. 9, how the policy rule list 600 read by the rule engine 953 of job manager 951 is used in the information processing system 900 will be described. It is to be noted that as described previously, the job manager 951 also reads the job execution schedule 200, action list 400 and event list 500 and hence the rule engine 953 can also make reference to the contents of job execution schedule 200, action list 400 and event list 500.

Normally, in the information processing system 900, the job manager 951 communicates with the agent 954a or 954b by consulting the job execution schedule 200 to designate execution of jobs at start times described in the job execution schedule in a computer of a designated computer name, so that a plurality of jobs can be executed.

Under such circumstances, when an event including such a fault that a program constituting a job abnormally ends occurs in the information processing system 900, a status monitor of an agent executed by a job execution computer executing the job first detects the event and then, as described previously, prepares an event notice message containing a computer name of the job execution computer subject to the occurrence of the event, a time at which the event occurs and a type of the event and transmits it to the job manager 951. The rule engine 953 of job manager 951 receives the event notice message, acquires from the event notice message the computer name of the job execution computer subject to the occurrence of the event and the event occurrence time and retrieves the job execution schedule by using the acquired data to specify a job name of the job subject to the event occurrence. It will be appreciated that the job name may be contained in the event notice message at the time that the message is transmitted from the agent. In that case, the process of retrieving the job execution schedule can be omitted.

Subsequently, the rule engine 953 acquires the type of the event stored in the event notice message, retrieves the event list by using it, acquires an entry having the corresponding type of event and acquires a serial number stored in the entry.

Next, by using the acquired job name, event occurrence time and serial number, the rule engine 953 retrieves the policy rule list to acquire a corresponding policy rule (any one of policy rules described in the policy rule list 600 (FIG. 6)) and acquire a serial number of an action stored in the policy rule. Further, the rule engine 953 retrieves the action list by using the acquired serial number of action and acquires an entry (that is, action) having the same serial number as the action serial number.

Next, the rule engine 953 executes an action to user interface and an action to controller, both the actions being described in the acquired action. For example, when the action to user interface and the action to controller are described as subroutines in any programming language, a processing system of the programming language is called to cause it to execute the contents described in the action to user interface and the action to controller. Normally, as a result of execution of the action to user interface, the user interface 952 is called, so that a process of informing the system manager of information processing system of the occurrence of the event, for example, displaying an error message on a terminal and starting alarm, can be executed automatically. In addition, as a result of execution of the action to controller, a command message from the job manager is transmitted via the network 903 to either controller 956a or 956b or both of them, with the result that an administration process such as re-execution of the job, re-execution of the job with another computer or stoppage of the job can be executed automatically.

In the present invention, the policy rules to be set job by job are determined not by the input person of each job but by the system manager of information processing system and a policy rule for always minimizing the amount of loss in the whole of the information processing system can be set.

Accordingly, the job manager can perform automatic administration for optimizing the whole of the information processing system by using policy rules generated according to the invention.

Especially, in the invention, the policy rules to be set job by job are determined not by the input person of each job but by the system manager of information processing system. In addition, in respect of individual jobs scheduled to be executed, actions are determined in combinations of all possible event occurrence times and all possible event types such that the loss amount in the whole of the information processing system can always be minimized and they are set as policy rules. Accordingly, the job manager can perform carefully thought out, optimum automatic administration for always minimizing the loss amount throughout the information processing system by taking the occurrence times of events such as faults and the types of events into account through the use of the policy rules generated according to the invention.

The present application claims priority from Japanese application JP 2003-086919 filed on Mar. 27, 2003, the content of which is hereby incorporated by reference into this application.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for generating policy rules which is adapted to automatically execute administration during execution of a plurality of jobs in an information processing system by using the policy rules describing actions adoptable when an event such as a fault occurs, comprising:
    storing a job execution schedule containing complete schedule times of said plurality of jobs; and
    storing a job execution condition describing an execution limit condition and a method of evaluating an amount of loss incurred when said execution limit condition is not met, in respect of each of said plurality of jobs;
    wherein a rule generation tool, under control by a processor of a policy rule generator, executes:
    evaluating the amount of loss by making reference to said job execution schedule and said job execution condition when a special action is taken in the event that a special event occurs in a special one of said jobs at a special time; and
    executing the evaluating the amount of loss in respect of all of plural actions prepared for said special job and said special event at said special time and determining an action which minimizes the evaluated loss amount thereby to generate a policy rule;
    wherein the storing of the job execution condition includes describing a function as the method of evaluating the amount of loss incurred when said limit condition is not met, and the evaluating the amount of loss includes executing said function; and
    wherein said function is a function using a delay time of job completion as an argument and in executing said function, the delay time of job completion is calculated.

2. A policy rule generation method according to claim 1, wherein the storing the job execution condition includes describing a requested complete time of the job as said execution limit condition.

3. A policy rule generation method according to claim 1 comprising:
    describing, by said rule generation tool,each of said one or more actions as a subroutine for modifying said job execution schedule,
    wherein the evaluating the amount of loss when a special action is taken includes executing a subroutine describing the action in question to modify said job execution schedule.

4. A policy rule generation method according to claim 1, wherein the determining the action which minimizes the evaluated loss amount is executed at all schedule times at which one or more jobs are being executed.

5. A method for generating policy rules which automatically execute administration during execution of a plurality of jobs by using the policy rules by an information processing system including a job execution computer for executing a job and an administration computer for assigning said job to said job execution computer, comprising:
    storing a job execution schedule containing complete schedule times of said plurality of jobs; and
    storing a job execution condition describing an execution limit condition and a method of evaluating an amount of loss incurred when said execution limit condition is not met, in respect of each of said plurality of jobs;
    wherein a rule generation tool, under control by a processor of a policy rule generator, executes:
    evaluating an amount of loss by making reference to said job execution schedule and said job execution condition when a special action is taken in the event that a special event occurs in a special one of said jobs at a special time; and
    executing the evaluating the amount of loss in respect of all of plural actions prepared for said special job and said special event at said special time and determining an action which minimizes the evaluated loss amount thereby to generate a policy rule;
    wherein a job manager executes, under control by said administration computer, a plurality of jobs by using policy rules when an event such as a fault occurs;
    wherein the storing of the job execution condition includes describing a function as the method of evaluating an amount of loss incurred when said limit condition is not met. and the evaluating the amount of loss includes executing said function; and
    wherein said function is a function using a delay time of job completion is an argument and in executing said function, the delay time of job completion is calculated.

6. A method for generating policy rules which is adapted to automatically execute administration during execution of a plurality of jobs in an information processing system by using the policy rules describing actions adoptable when an event such as a fault occurs, comprising:
    storing a job execution schedule containing start times, complete schedule times of said plurality of jobs, and names of computers to execute said plurality of jobs; and
    storing a job execution condition describing an execution limit condition and a method of evaluating an amount of loss incurred when said execution limit condition is not met, in respect of each of said plurality of jobs;
    wherein a rule generation tool, under control by a processor of a policy rule generator, executes:
    evaluating an amount of loss in both a special one of said jobs and succeeding jobs to be executed in a computer by making reference to said job execution schedule and said job execution condition when a special action is taken in the event that a special event occurs in said special one of said jobs at a special time; and executing the evaluating the amount of loss in respect of all of plural actions prepared for said special job and said special event and determining an action which minimizes the evaluated loss amount thereby to generate a policy rule;

wherein the storing of the job execution condition includes describing a function as the method of evaluating an amount of loss incurred when said limit condition is not met, and the evaluating the amount of loss includes executing said function: and wherein said function is a function using a delay time of job completion as an argument and in executing said function, the delay time of job completion is calculated.

7. A method for generating policy rules according to claim 6 comprising:

storing an action list of possible actions adoptable when an event such as fault occurs, wherein said specific action is designated from said possible actions in said action list.

8. A method for generating policy rules which is adapted to automatically execute administration during execution of a plurality of jobs in an information processing system by using the policy rules describing actions adoptable when an event such as a fault occurs, comprising:

storing a job execution schedule containing complete schedule times of said plurality of jobs; and storing a job execution condition describing an execution limit condition and a method of evaluating an amount of loss incurred when said execution limit condition is not met, in respect of each of said plurality of jobs;

wherein a rule generation tool, under control by a processor of a policy rule generator, executes:

evaluating the amount of loss by making reference to said job execution schedule and said job execution condition when a special action is taken in the event that a special event occurs in a special one of said jobs at a special time;

executing the evaluating the amount of loss in respect of all of plural actions prepared for said special job and said special event at said special time and determining an action which minimizes the evaluated loss amount thereby to generate a policy rule; and describing, by said rule generation tool, each of said one or more actions as a subroutine for modifying said job execution schedule, wherein the evaluating the amount of loss when a special action is taken includes executing a subroutine describing the action in question to modify said job execution schedule.

9. A policy rule generation method according to claim 8, wherein the storing the job execution condition includes describing a requested complete time of the job as said execution limit condition.

10. A policy rule generation method according to claim 8, wherein the determining the action which minimizes the evaluated loss amount is executed at all schedule times at which one or more jobs are being executed.

11. A method for generating policy rules which automatically execute administration during execution of a plurality of jobs by using the policy rules by an information processing system including a job execution computer for executing a job and an administration computer for assigning said job to said job execution computer, comprising:

storing a job execution schedule containing complete schedule times of said plurality of jobs; and storing a job execution condition describing an execution limit condition and a method of evaluating an amount of loss incurred when said execution limit condition is not met, in respect of each of said plurality of jobs;

wherein a rule generation tool, under control by a processor of a policy rule generator, executes:

evaluating the amount of loss by making reference to said job execution schedule and said job execution condition when a special action is taken in the event that a special event occurs in a special one of said jobs at a special time;

executing the evaluating the amount of loss in respect of all of plural actions prepared for said special job and said special event at said special time and determining an action which minimizes the evaluated loss amount thereby to generate a policy rule; and describing, by said rule generation tool, each of said one or more actions as a subroutine for modifying said job execution schedule, wherein a job manager executes, under control by said administration computer, a plurality of jobs by using policy rules when an event such as a fault occurs; and wherein the evaluating the amount of loss when a special action is taken includes executing a subroutine describing the action in question to modify said job execution schedule.

12. A method for generating policy rules which is adapted to automatically execute administration during execution of a plurality of jobs in an information processing system by using the policy rules describing actions adoptable when an event such as a fault occurs, comprising:

storing a job execution schedule containing start times, complete schedule times of said plurality of jobs, and names of computers to execute said plurality of jobs; and storing a job execution condition describing an execution limit condition and a method of evaluating an amount of loss incurred when said execution limit condition is not met, in respect of each of said plurality of jobs;

wherein a rule generation tool, under control by a processor of a policy rule generator, executes:

evaluating the amount of loss in both a special one of said jobs and succeeding jobs to be executed in a computer by making reference to said job execution schedule and said job execution condition when a special action is taken in the event that a special event occurs in said special one of said jobs at a special time;

executing the evaluating the amount of loss in respect of all of plural actions prepared for said special job and said special event and determining an action which minimizes the evaluated loss amount thereby to generate a policy rule; and describing, by said rule generation tool, each of said one or more actions as a subroutine for modifying said job execution schedule, wherein the evaluating the amount of loss when a special action is taken includes executing a subroutine describing the action in question to modify said job execution schedule.

13. A method for generating policy rules according to claim 12 comprising:

storing an action list of possible actions adoptable when an event such as fault occurs, wherein said specific action is designated from said possible actions in said action list.

* * * * *